US010717090B2

(12) United States Patent
Dimitriadis et al.

(10) Patent No.: US 10,717,090 B2
(45) Date of Patent: Jul. 21, 2020

(54) DEPRESSION OF COPPER AND IRON SULFIDES IN MOLYBDENITE FLOTATION CIRCUITS

(71) Applicant: TESSENDERLO KERLEY, INC., Phoenix, AZ (US)

(72) Inventors: Alexandros Dimitriadis, Chandler, AZ (US); Theodore E. Cook, Phoenix, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 586 days.

(21) Appl. No.: 15/303,207

(22) PCT Filed: Apr. 9, 2015

(86) PCT No.: PCT/US2015/025067
§ 371 (c)(1),
(2) Date: Oct. 10, 2016

(87) PCT Pub. No.: WO2015/157498
PCT Pub. Date: Oct. 15, 2015

(65) Prior Publication Data
US 2017/0028409 A1  Feb. 2, 2017

Related U.S. Application Data

(60) Provisional application No. 61/978,720, filed on Apr. 11, 2014.

(51) Int. Cl.
  *B03D 1/002*  (2006.01)
  *B03D 1/06*   (2006.01)
  *B03D 1/02*   (2006.01)
(52) U.S. Cl.
  CPC .............. *B03D 1/002* (2013.01); *B03D 1/02* (2013.01); *B03D 1/028* (2013.01); *B03D 1/06* (2013.01);
(Continued)

(58) Field of Classification Search
CPC . B03D 1/02; B03D 1/06; B03D 1/002; B03D 2201/06; B03D 2203/02
(Continued)

(56) References Cited

U.S. PATENT DOCUMENTS 2,281,880 A  5/1942 Le Baron
2,608,298 A  8/1952 Arbiter et al.
(Continued)

FOREIGN PATENT DOCUMENTS

CA    1070034 A    1/1980
WO    2011/067580  6/2011

OTHER PUBLICATIONS

Carvallo, Francisco Carey, Opposition Brief Against Patent Application 02580-2016, May 2017, Santiago, Chile, original 22 page Spanish-language document followed by 25 page English translation, 47 pages total.
(Continued)

*Primary Examiner* — Thomas M Lithgow
(74) *Attorney, Agent, or Firm* — Fennemore Craig, P.C.

(57) ABSTRACT

A method of depressing copper sulfides and iron sulfides in a molybdenite flotation recovery process that uses alkaline or alkaline earth polysulfides. The method of enriching molybdenite content from a slurry having molybdenite and at least one of iron sulfides and copper sulfides can include the steps of adding an effective amount of a depressing reagent selected from one or more alkaline polysulfides, alkaline earth polysulfides, or a mixture thereof, to the slurry, wherein the pH of the slurry is greater than about 8.0; and passing a gas through the slurry to separate material by selective flotation, and recovering the molybdenite from a froth.

21 Claims, 1 Drawing Sheet

(52) U.S. Cl.
CPC ...... *B03D 2201/06* (2013.01); *B03D 2203/02* (2013.01)

(58) Field of Classification Search
USPC ........................................................ 209/167
See application file for complete search history.

(56) References Cited

U.S. PATENT DOCUMENTS

| | | |
|---|---|---|
| 3,220,551 A | 11/1965 | Moyer |
| 3,375,924 A | 4/1968 | Corbett et al. |
| 3,655,044 A | 4/1972 | Delaney |
| 3,883,421 A * | 5/1975 | Cutting .................. B03B 13/04 209/1 |
| 4,231,859 A | 11/1980 | Huiatt et al. |
| 4,549,959 A | 10/1985 | Armstrong et al. |
| 2011/0155651 A1 * | 6/2011 | Gorain .................. B03D 1/085 209/162 |

OTHER PUBLICATIONS

Arizona Geological Survey, Romney, A.B., Copper, Molybdenum Separation in Operation at Morencie, Arizona, Jun. 14, 1952, 4 pages.

Bustamante, Heriberto & Castro, Sergio, Molybdenite Flotation Chalcocite Depression Study, original 8 page Spanish-language document followed by 8 page English translation, 16 pages total.

Lulea University of Technology, Hanumantha Rao, K., Revisiting Sulphide Mineral Flotation: A Few Priorities and Directions, Jun. 5, 2012, 10 pages.

Search report dated Dec. 21, 2017 in European Patent Office Application No. 15777482.9.

G. W. Poling and M. J. V. Beattie "Selective depression in complex sulphide flotation", Principles of Mineral Flotation / [The Wark Symposium], Adelaide, Australia Symposia Series, Australasian Institute of Mining and Metallurgy, vol. 40, Dec. 31, 1983, pp. 137-146.

International Search Report dated Jul. 8, 2015 for corresponding International Application No. PCT/US2015/025067, 3 pages.

International Preliminary Report on Patentability with Annexes dated Mar. 31, 2016 for corresponding International Application No. PCT/US2015/025067, 8 pages.

Article 34 Amendment dated Sep. 2, 2015 for corresponding International Application No. PCT/US2015/025067, 12 pages.

* cited by examiner

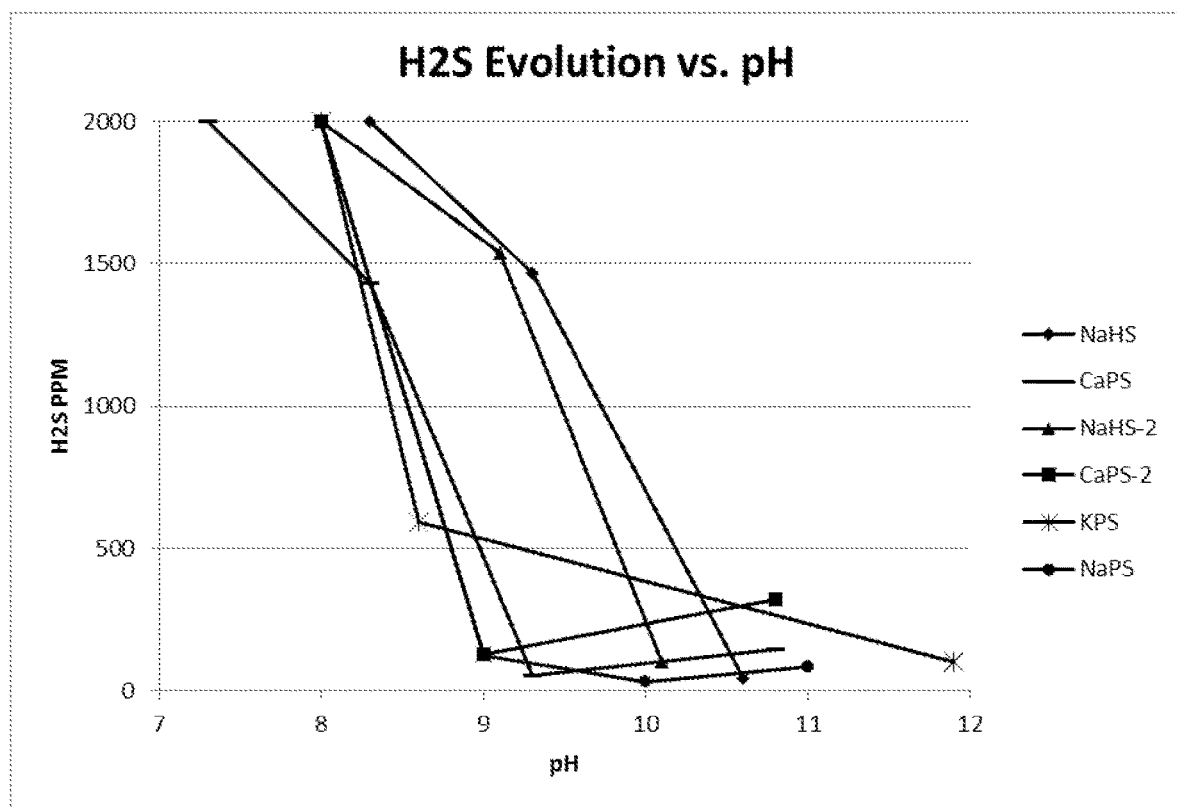

DEPRESSION OF COPPER AND IRON SULFIDES IN MOLYBDENITE FLOTATION CIRCUITS

CROSS-REFERENCE TO RELATED APPLICATIONS

This application claims priority to U.S. Provisional Application No. 61/978,720 filed on Apr. 11, 2014, and Patent Cooperation Treaty Application No. PCT/US2015/025067 filed on Apr. 9, 2015, each titled DEPRESSION OF COPPER AND IRON SULFIDES IN MOLYBDENITE FLOTATION CIRCUITS, the entire contents of both applications being incorporated herein for all legal purposes.

TECHNICAL FIELD

The invention relates to a method of recovery of molybdenite from copper/molybdenum sulfide concentrates, iron/molybdenum sulfide concentrates, mixed iron/copper/molybdenum sulfide concentrates, and primary molybdenum sulfide concentrates, as the term concentrates is used in the art, by subjecting a concentrate to a flotation process which uses various chemicals to effect the depression of copper, iron or other sulfide minerals, the improvement being the use of polysulfide treatment additives at elevated pH to depress copper sulfides and iron sulfides.

BACKGROUND ART

Primary Molybdenum and many Copper mines contain molybdenum (Mo) sulfides and also iron and copper sulfides in their ore bodies. Typically, a range of copper sulfides, iron sulfides, molybdenite and other less prevalent sulfides are associated in the ore bodies. In order to achieve an economic value, the Molybdenite (MoS2) must be separated and concentrated to approximately 45-50% Mo. This is typically done by a series of flotation cells, wherein various chemical treatments result in floating of molybdenite while copper-containing and iron-containing minerals do not attach to a gas bubble and therefore do not float. Such flotation separation technologies are well known in the art, and an early reference on various chemicals which enhance the separation of molybdenite from other sulfides is U.S. Pat. No. 2,608,298. Chemical depressants are used to accomplish this separation in a flotation process after an initial or bulk concentrate is produced. Added reagents depress the other sulfides by inhibiting their flotation, allowing primarily just molybdenite to attach to the gas bubble and being recovered from a froth. Typically, molybdenite flotation and recovery from bulk copper molybdenum concentrates has involved the use of alkalisulfides, Nokes reagents, cyanides, oxidants, and/or thermal treatment to depress copper and iron sulfide minerals. The bulk copper/molybdenum concentrate or molydenum plant feed generally varies from 0.2% Mo to 3.5% Mo, and with traditional reagents the single-stage rougher flotation recovery of molybdenite varies between 40% and 90+% at a concentrate grade of 5% to 25% Mo.

U.S. Pat. No. 2,608,298 teaches using a mixture of polysulfides and thiosulfate, in combination with at least one water soluble inorganic metal salt, other than salts of alkali and alkaline earth metals. Exemplary salts include ferric, ferrous, copper, zinc, or aluminum. The patent teaches that these salts can be generated by adding acid to the slurry to reduce the pH below 7, but not below about 5.5. Subsequent addition of the polysulfide and thiosulfate reagent is taught to raise the pH and in some cases to bring the pH "back to a point above the neutral point." This patent teaches that a substantial proportion of each of thiosulfate and polysulfide must be present, and that there is little advantage gained by using more than 8 pounds of reagent per ton.

Current practices in the industry consist of a number of different chemical schemes which use Sodium hydrosulfide (NaHS or NaSH), Ferro Cyanide, or Nokes reagent (Blend of thiophosphates or dithioarsenates and usually also containing sulfides) conditioning followed by flotation and in some cases, additional grinding, to achieve a marketable $MoS_2$ concentrate. Sodium hydrosulfide (NaHS) flotation is the benchmark standard, in very common use, but with inherent HSE (Health, Safety and Environmental) concerns, and also readily releasing toxic H2S when pH is reduced. An option for lower pH separation is using Ferro-Cyanide where the process consists of conditioning a Cu/Mo concentrate with a Potassium Ferro Cyanide at an acidic pH followed by multiple steps of flotation and possible use of additional depressants such as alkaline dithiophosphates to make a final molybdenite concentrate. This process also has significant health and safety issues, and is generally less effective in comparison to using NaHS.

The Nokes depression scheme described in U.S. Pat. No. 2,811,255 consists of conditioning a slurry comprising copper-containing and molybdenum-containing minerals, ("a CuMo slurry") with Nokes Reagent (Sodium Dithiophosphate or Sodium Dithioarsenate) followed by multiple steps of flotation until an acceptable Molybdenite concentrate is achieved.

Other processes have been used to depress the copper and iron sulfides and allow the $MoS_2$ to be concentrated by flotation. A partial list includes: 1) Cu/Mo Concentrate roasting followed by moly flotation as described by Inspiration Cons Copper Co, Kennecott Copper Corp, Hayden Division and others was used in the 1960's; 2) Autoclaving in addition to Nokes Reagent in moly flotation as described by Inspiration Cons Copper Co, 1969; 3) Ferro-Cyanide conditioning and moly flotation as used by FMI Morenci Division; 4) Open steaming in conjunction with Nokes Reagent and moly flotation as described by Bagdad Copper Co, 1970; 5) Hydrogen Peroxide conditioning and moly flotation as described by Magma Copper Co, San Manuel Moly Plant, circa 1970's; 6) Hot water dilution in conjunction with NaHS conditioning and moly flotation as described by Anamax Copper Co, 1978; 7) Conditioning with NaHS in conjunction with moly flotation at monitored ORP ranges using Nitrogen for optimum depressant consumption as used by FMI Sierrita and Bagdad Divisions and others; 8) ozone conditioning as described by Ye, W. H. Jang, M. R. Yalamanchili, 1990; and 9) Molybdenite flotation using sodium sulfide while adjusting the reducing potential as described by M. Kolandoozani and H. Noon.

WO 99/66013 discloses the formation of a compound of molybdenum and sulfur using a molybdenum and thiuram disulfide in an organic solvent, and the removal of solvent. Calcium polysulfide ("CaPS") is used in certain hydrometallurgical applications, such as to fixate chrome and to remove more soluble heavy metals from wastewater streams.

Existing flotation practice for the separation of molybdenite from iron/molybdenum and/or copper/molybdenum concentrates generally utilizes types of reagents that lead to concern with respect to health, safety, and environmental issues. There are many such concerns, including transporting materials that contain or readily form hydrogen sulfide, utilizing reagents in the flotation process that are highly toxic and/or that in use form highly toxic hydrogen sulfide off-gassing, and other concerns. With some known reagents it may result in low Mo recovery or requires many stages of flotation. Any improvements in molybdenite flotation practice, especially with respect to health and safety, would be of significant importance.

SUMMARY OF INVENTION

The invention relates to the use of Alkaline (earth) Polysulfide reagents as depressing reagents in dosages such that the flotation pulp oxidation-reduction potential (ORP) is maintained in a range in which Molybdenite will float, thereby separating Molybdenite from copper and/or iron sulfides.

In one embodiment the invention includes a method of enriching a concentrate (a slurry or mixture comprising liquid, molybdenite, and typically other solids), comprising the steps of a) providing a concentrate comprising molybdenite and one or more of copper sulfide and iron sulfide at pH greater than about 8, for example greater than 8.5, and preferably greater than 9; b) adding an effective amount of one or more polysulfides; c) passing a gas through the slurry to separate material by selective flotation, recovering the molybdenite from a froth, wherein the polysulfide(s) is effective at selectively depressing copper sulfide, iron sulfide, or both such that little of these materials are trapped in the froth. Advantageously no metal anions are added with the depressing agent. Advantageously no thiosulfates or sulfides are added with the depressing agent.

The pH of the concentrate can be adjusted up with the depressing agents and optionally even with base before, after, or at the same time that depressing agents are added. Therefore, in another embodiment the invention includes method of enriching a concentrate slurry comprising molybdenite and at least one of iron sulfides and copper sulfides, comprising the steps of a) providing a concentrate comprising molybdenite and one or more of copper sulfide and iron sulfide; b) adding an effective amount of a depressing reagent, wherein the effective amount of depressing reagent comprises least 0.017 Kg polysulfide, alternatively at least 0.003 Kg, for example at least 0.0035 Kg or at least 0.004 Kg of polysulfides selected from alkaline polysulfides, alkaline earth polysulfides, or a mixture thereof, per kg of concentrate (dry basis), wherein the pH of the resulting concentrate is greater than about 8, preferably greater than 8.5; and c) passing a gas through the concentrate to separate material by selective flotation, recovering the molybdenite from a froth, wherein the polysulfide is effective at selectively depressing copper sulfide, iron sulfide, or both. Advantageously no metal anions are added with the depressing agent. Advantageously no thiosulfates or sulfides are added with the depressing agent.

In both major embodiments significant technical and economic advantage can obtained by manufacturing the polysulfide depressing reagent comprising alkaline earth polysulfides, alkaline polysulfides, or a mixture thereof, at a location at or near where the flotation process is occurring.

In each case, the phrase "recovering the molybdenite from a froth" means that most, and often essentially all, of the molybdenite present is recovered in the froth. Also in each case, the phrase "little of these materials are trapped in the froth" means most of the copper sulfide, iron sulfide, or both remain in the slurry and are not in the froth. The various percentages of molybdenite recovery and copper/iron sulfides carryover that are economically viable and beneficial depend on many factors, but are readily ascertainable to one of ordinary skill in the art. The terms "concentrate," "concentrate slurry," and "slurry" are used interchangeably herein and mean a slurry comprising water, molybdenite, and at least one of a copper sulfide or iron sulfide. The invention is described in terms of molybdenite (MoS2), but should also be useful for other known molybdenum sulfide mineral. The term "copper sulfide" means one or more of any known copper sulfide mineral, including for example chalcocite, villamaninite, covellite, yarrowite, spionkopite, geerite, anilite, digenite, and the like. The term "iron sulfide" means one or more of any known iron sulfide material, including for example Iron(II) sulfide (amorphous), Greigite, Pyrrhotite, Troilite, Mackinawite, Marcasite, Pyrite, and the like.

The polysulfide depressing reagent is selected from non-organic alkaline earth polysulfides and non-organic alkaline polysulfides, and is more particularly directed toward instances when the majority of sulfides and polysulfides added to the slurry are calcium polysulfide, sodium polysulfide, potassium polysulfide, or any mixture thereof. While other alkali metal and alkaline earth metal polysulfides can be used, generally only calcium polysulfide, sodium polysulfide, and potassium polysulfide were tested as these are expected to be primary commercial embodiments. In an embodiment, the preferred polysulfide is an alkaline polysulfide (alkali metal salts of polysulfide anions), for example primarily of the formula $X\text{-}S_q\text{-}X$, where the X are independently selected from alkali metal ions such as sodium and potassium ions, preferably sodium ions, the "S" has its normal meaning, that is, a sulfide, and "q" for each molecule is an integer between 2 and about 5, but where the q value for a mixed composition is often an average value greater than 2. A preferred alkaline polysulfide had an "n" value between 2 and 4, more preferably between 2 and 2.5 or between 3.5 and 4, for example about 2 or about 4. In another embodiment, the alkaline earth polysulfide is selected from $Y\text{-}S_q$, where Y is an alkaline earth ion, preferably calcium but magnesium is also operative, and q is an integer between 2 and 6, for example between 3 and 6, with a preferred average q being between 4 and 5, for example q is equal to an average value between 4 and 4.5, more particularly a value of about 4.1. It is also envisioned to use mixtures of alkaline earth polysulfides and alkali metal polysulfides, where the q value would be selected by the user so that the material had sufficient solubility.

The depressing reagent is preferably substantially free of thiosulfates, which for this process does not appreciably aid depression and separation. In a preferred embodiment there is little thiosulfate, for example less than 10% the weight of thiosulfate added as the amount of polysulfide reagent added, more preferably less than 5%, or a negligible amount or less of thiosulfate present in the added depressing reagent. A minor amount of thiosulfate, typically less than 2% by weight, may be present in polysulfide reagents as a contaminant.

The depressing agent is preferably substantially free of NaSH. Low levels of polysulfides may may be useful with minor quantities of NaSH. In a preferred embodiment there is little NaSH, for example less than 10% the weight of NaSH added as the amount of polysulfide reagent added, more preferably less than 5%, or a negligible amount or less of NaSH present in the added depressing reagent.

A portion of an alkaline polysulfide may have one of the alkali metal atoms replaced by ammonium ion to make an ammonium polysulfide. However, ammonium polysulfide has inherent HSE issues similar to NaHS, and in some environments are more severe for ammonium polysulfide than NaHS due to the higher vapor pressures of $H_2S$ and NH$_3$ as well as the subsequent higher H$_2$S evolution rate when pH is decreased. In preferred embodiments substantially no ammonium polysulfide is present.

Treatment rates with alkaline or alkaline earth polysulfide(s) are similar to those of NaHS. Treatment rates are herein given in both pounds of depressing agent per US ton (2000 pounds) of concentrate (dry basis), and in Kg of depressing agent per Kg of concentrate (dry basis), where the conversion between the two sets of units is a factor of 0.0005. A treatment rate of 3.4 pounds polysulfide per ton of concentrate (0.017 Kg polysulfide per Kg concentrate) to 40 pounds per ton of concentrate (0.02 Kg polysulfide per Kg concentrate concentrate), for example 6 to 25 pounds polysulfide per ton concentrate (0.003 to 0.0125 Kg polysulfides/Kg concentrate) is useful, more preferably using o to 20 pounds per ton (0.003 Kg/Kg to 0.01 Kg/Kg), or alternatively greater than 7 to 23 pounds per ton (0.0035 Kg/Kg to 0.0115 Kg/Kg) of alkaline or alkaline earth polysulfide per ton of concentrate. Lower use rates were not extensively tested but may be achieved depending on feed and process conditions. It is possible to run with as little as 3.4 pounds polysulfide per ton of concentrate (0.0017 kg polysulfide per Kg concentrate), but for low use rates between 3.4 and 6 pound per ton of concentrates the depressing reagent should be substantially free of, or free of, thiosulfates, and even preferably of substantially free of, or free of, thiophosphates and thioarsenates, or, alternatively or additionally, the pH of the concentrate pre-treatment should be over 8. For calcium polysulfide, a treatment rate of about 3.4 to 12 pounds per ton (0.0017 to 0.006 Kg polysulfides/Kg concentrate), or alternatively 6 to 12 pounds per ton (0.003 to 0.006 Kg polysulfides/Kg concentrate), for example between about 3.4 to about 9 pounds per ton (0.0017 to 0.0045 Kg polysulfides/Kg concentrate), or 6 to 9 pounds per ton (0.003 to 0.0045 Kg polysulfides/Kg concentrate), or 7 to 9 pounds per ton of concentrate (0.0035 to 0.0045 Kg polysulfides/Kg concentrate), is a useful and commercially advantageous treatment dosage. Of course, one can treat with up to 40 pounds polysulfides per ton, but little additional advantage is seen using large quantities. Examples were tested using a very wide range, from 3.4 to over 8 pounds calcium polysulfide per ton of concentrate (0.0017 to over 0.004 Kg polysulfides/Kg concentrate). For sodium polysulfide a treatment rate of about 6 to 18 pounds per ton (0.003 to 0.009 Kg polysulfides/Kg concentrate) or alternatively 7 to about 18 pounds per ton (0.0035 to 0.009 Kg polysulfides/Kg concentrate), for example between about 10 to 16 pounds per ton (0.005 to 0.008 Kg polysulfides/Kg concentrate), is a useful and commercially advantageous treatment dosage. Examples with sodium polysulfide were tested using 9 to 15 pounds sodium polysulfide per ton of concentrate (0.0045 to 0.0075 Kg polysulfides/Kg concentrate). For potassium polysulfide a treatment rate of about 6 to 15 pounds per ton (0.003 to 0.0075 Kg polysulfides/Kg concentrate) or alternatively 7 to about 15 pounds per ton (0.0035 to 0.0075 Kg polysulfides/Kg concentrate), for example between about 6 to 12 pounds per ton (0.003 to 0.006 Kg polysulfides/Kg concentrate), is a useful and commercially advantageous treatment dosage. Examples with potassium polysulfide were tested using 6 to 11 pounds per ton of concentrate (0.003 to 0.0055 Kg polysulfides/Kg concentrate).

In some embodiments and under certain conditions, the amount of polysulfide can be lowered to about 5 pounds per ton (0.0025 Kg/Kg) without the need to add additional constituents, such as specifically acids to lower the pH, and/or such as thiosulfates or metal ions. Advantageously in some of these situations the pH of the slurry should be maintained well above 8, and there should be substantially no added thiosulfate and no added metal ions, and generally preferably no added thiosulfate and no added metal ions. The polysulfide dosage rate is controlled to maintain an optimum ORP range to ensure effective and efficient depression of copper and iron sulfides in order to maximize molybdenite recovery. The subsequent pH will be directly correlated with the amount of polysulfide reagent added such that the higher the dosage rate will result in a higher flotation circuit pH. The ORP range required is based on and determined by the mineralogy of the Cu/Mo concentrate feed and the specific depressant reagent used. For example, the primary mineral in Cu/Mo concentrate feed is Chalcopyrite which would require a certain ORP range with reagent X. This ORP range would change if additional secondary minerals such as Chalcocite or Covelite were present.

Advantageously the concentrate starts at a high pH, for example greater than 8, preferably greater than 8.5, for example greater than 9. Advantageously the concentrate is maintained at a high pH during the separation, for example maintained at a pH greater than 8, preferably greater than 8.5, for example greater than 9. Note that metal ions as discussed in U.S. Pat. No. 2,608,298 cannot exist in a slurry with a high pH, for example in a liquid having a pH greater than pH 8, because the metal ions would immediately precipitate as insoluble metal hydroxides. Addition of metal ions as contemplated in U.S. Pat. No. 2,608,298 to a slurry having pH 8, or pH 9 or above, would immediately result in precipitation of virtually all the added metal ions as metal hydroxides.

In yet another embodiment, the invention includes a method of enriching a concentrate slurry of molybdenite, comprising the steps of a) manufacturing a polysulfide material selected from alkaline earth polysulfides and alkaline polysulfides; b) providing an aqueous concentrate (slurry) comprising molybdenite and one or more of copper sulfide and iron sulfide, said aqueous concentrate advantageously but not necessarily having a pH greater than 8, typically greater than about 8.5, for example between about 9 and 11, or between 9 and 10; c) adding an effective amount of one or more of the manufactured polysulfides, wherein the pH of the resulting slurry is 8 or above; and c) passing a gas through the slurry to separate material by selective flotation, recovering the molybdenite from the froth, wherein the polysulfides are effective at selectively causing most copper sulfide, iron sulfide, or both present to be depressed and not attach to a gas bubble while the majority of the molybdenite remains in the froth.

In any of the embodiments of the invention disclosed herein, significant cost and health/safety advantages can be realized by manufacturing the polysulfide depressing reagents on-site or nearby to the separation/flotation plant. Alkaline polysulfide may be manufactured by, for example, reacting sodium hydroxide or calcium hydroxide with sulfur at high temperature. Calcium polysulfide may be prepared by boiling calcium hydroxide and sulfur together with a small amount of surfactant, or as otherwise found in the art. This ability to manufacture depressing agents on-site from substantially non-toxic ingredients is a strong advantage, since most prior art depressing agents are both extremely toxic and are typically manufactured from extremely toxic precursors.

The use of flotation separation in the processing of molybdenite ore is well known in the industry and needs no further elaboration.

The alkaline earth polysulfides and alkaline polysulfides, of which the most preferred include Calcium Polysulfide ("CaPS"), Potassium Polysulfide ("KPS") and Sodium Polysulfide ("NaPS") provide significant advantages with respect to health, safety, environmental (HSE) in handling, storage and application. This is primarily due to having much lower/negligible toxic Hydrogen Sulfide (H2S) vapor pressures in comparison to the NaSH standard at the pH ranges of interest to processors. Further, the alkaline earth polysulfides and alkaline polysulfides provide comparable separation performance to traditional alkali sulfides and are cost-effective.

More particularly, H2S evolution is very low, compared to the H2S evolution that occurs using the NaSH process, when concentrates have a pH greater than 8, for example greater than 8.5, or for example greater than 9.

There is little difference in overall recovery and performance between the NaHS reagent and the polysulfide reagents if the treated concentrate has a pH greater than 10 or 10.5. However, the relative safety of polysulfides versus NaHS is still substantial even with processes using very high pH concentrates, because the ease of manufacturing the material near point of use and the low toxicity of polysulfides (compared to NaHS) during handling.

Most polysulfides useful in this process are relatively stable and non-hazardous, and can therefore be shipped to point of use. Unlike the alkali sulfides normally used, which are extremely toxic and can generate toxic H2S when added to acidic fluids, the polysulfides used in the current invention have low toxicity, for example the LD50 for mammals with calcium polysulfide is about 0.8 grams per kilogram of body weight. Even greater storage and safety benefits can be achieved if the polysulfides are manufactured at or near point-of-use, where ingredients to manufacture the polysulfides include sulfur and calcium hydroxide or lime, for example. The production of these polysulfides can be geographically located close to or on site of end use application due to access/storage availability of required raw materials and feasibility of plant economics. This allows for a more steady supply of product at a logistical advantage.

In contrast, economic manufacture of the standard NaHS product requires H2S as a primary raw material which is typically generated at Refineries locations. Onsite production of NaHS would not be economically feasible or desired from an HSE perspective.

The polysulfide reagents according to the present invention have been proven to be comparatively effective as the NaSH standard in the recovery of MoS2 from the bulk concentrates of a variety of complex Cu/Mo and Fe/Mo ore bodies. In addition to this, these products have the potential for increased effectiveness and safer overall HSE qualities in certain Cu/Mo and Fe/Mo flotation circuits that utilize acid for pH control or Carbon Dioxide (CO2) vs. Nitrogen as the flotation medium. The acid or CO2 in these applications decreases the slurry pH and results in increased potential for NaSH reagent decomposition and H2S release. Due to the inherent chemistry of Polysulfides, the potential release of H2S, as well as the actual H2S evolution rate, due to this phenomenon is significantly less for the polysulfides than for NaSH.

Moreover, the present invention offers three specifically advantageous additional reagents that can control the ORP and effectively separate molybdenum sulfide, e.g., MoS2, in the Molybdenum Plant. The differences in the vapor pressures and toxic parameters of these chemicals when compared to NaSH, present the plant operator a wider variety of options in choosing a depressant for molybdenite recovery and for optimizing the process. Advantages include but are not limited to ability to manufacture depressant on-site or nearby from non-toxic precursors, use of relatively non-toxic compounds as depressing agents, lower prospect for evolution of hydrogen sulfide so less need to carefully monitor and control certain aspects of the process, excellent MoS2 recovery, and good economics.

Manufacturing of Reagents is straightforward. All of the referenced Polysulfides are manufactured in similar process equipment with variations in the formulation and reaction parameters. A summary of the manufacturing steps are as follows: a) Providing of raw materials including process water, caustic [Ca(OH)2, KOH or NaOH] and Sulfur to a batch or continuously stirred tank reactor, where the reactor agitator is designed for the suspension of solids and re-incorporation of solids from the surface, and b) collecting the product polysulfides at the conclusion of the reaction. The formulation and addition order of raw materials is advantageously such to ensure a final product specification with regards to assay, alkali and Sulfur content, or a final off-spec product could result with a high salt out temperature, increased solids, and low assay. The temperature and reaction residence time can be controlled in order to minimize side products (primarily Thiosulfates), maximize raw material utilization and minimize final solids content. The reaction process preferably comprises initial heat input to reach its activation energy and optimized reaction temperature for increased kinetics. Once the reaction takes off, it is slightly exothermic and may require some cooling. In continuous operation, the cooling or heating requirements can be dependent on manufacturing volumes and end process application requirements.

Certain polysulfides are preferred. A blend of calcium polysulfide having between 4 and 5 sulfur atoms per molecule is a preferred reagent. The alkali metal polysulfides $Na_2S_4$ and $K_2S_2$ are similarly preferred. Generally, a depressing reagent will have an average number of sulfide moieties per alkali and/or alkaline earth atom, and typically also a mixture of anions.

Use of thiosulfates is known, and this is not a polysulfide as described here. Use of significant quantities of thiosulfates along with polysulfides will remove several advantages of the method of the invention. Use of significant quantities of NaSH along with polysulfides will remove many advantages of the method of the invention. However, use of minor amounts of either may be warranted in certain situations due to the availability or cost of these additional depressing agents.

In preferred embodiments, the process takes place by the addition of polysulfides, without addition of the heavy metal salts (not including alkali metal or alkaline earth metal salts) as described in U.S. Pat. No. 2,608,298, and without sufficient addition of acid to cause the concentrate pH to fall below pH 8 as described in U.S. Pat. No. 2,608,298 to form heavy metal anions, and without added thiosulfate as described in U.S. Pat. No. 2,608,298. In each case, this statement does not preclude addition of negligible amounts of any of the above, where the amount is negligible if it has hardly any, i.e., less than 5 weight % measurable impact on copper sulfide or iron sulfide depression or on molybdenite recovery. Note that metal ions as discussed in U.S. Pat. No. 2,608,298 cannot exist in a slurry with a high pH, for example greater than about pH 8.5, because the metal ions would immediately precipitate as insoluble metal hydroxides. U.S. Pat. No. 2,608,298 taught adding metal salts, e.g., iron salts, copper salts, zinc salts, or aluminum salts. The patent showed no examples of adding salts to high-pH slurries, because the pH of such slurries are so high that any salts added would have been immediately precipitated.

Rather, the patent taught adding acid to generate the salts in-situ, which has the added benefit of creating an environment where the salts could continue to exist. The patent taught adjusting the pH to between 5 to "below 7," that is, creating an acidic environment. The amount of salts present would be controlled by the solubility of the metal hydroxides. The altering of the pH of the concentrate to allow for metal ions will cause H2S evolution.

The application of the polysulfide reagents to the molybdenite-containing slurry is similar to the treatment with NaHS. The Polysulfide reagents can be applied using the same storage, pumps, piping and instrumentation as the standard NaHS, therefore not requiring any changes to existing systems. Moreover, due to the Polysulfides having negligible H2S vapor pressures, a storage scrubber system which is recommended for NaHS is typically not required.

While the system can be optimized by altering the oxidation/reduction potential (ORP), the reagents are robust and can work over a range of potentials. For calcium polysulfide, an optimum ORP is −400 to −500 mV, preferably −430 to −470 mV or −460 to −470 mV. For sodium polysulfide, an optimum ORP is −400 to −500 mV, preferably −450 to −465 mV. For potassium polysulfide, an optimum ORP is −400 to −500 mV, preferably −450 to −480 mV. An optimum range in one embodiment is −430 to −480 mV.

FIG. 1 shows H2S concentration in headspace above a solution containing calcium polysulfide, a solution containing sodium polysulfide, a solution containing potassium polysulfide, and a solution containing NaHS versus pH. This FIGURE merely shows one of the several advantages of the invention, which is lower hydrogen sulfide evolution at the critical pH values.

BRIEF DESCRIPTION OF DRAWINGS

FIG. 1 shows results of headspace gas analysis for hydrogen sulfide over liquids containing both inventive and comparative depressing agents versus liquid pH.

DESCRIPTION OF EMBODIMENTS

These chemicals have been laboratory tested successfully using concentrates from three different Cu/Mo operations in the Southwest U.S. and Mexico. A list of typical test parameters is shown below;
   Conditioning Time: 1 to 30 Minutes as necessary
   Float time: 12 to 30 minutes as necessary.
   Froth removal rate: Slow to moderate for good selectivity.
   ORP value in Conditioning and Flotation
   CaPS: −430 to −580 mV; at 3.4 to 8#/T dosage rate
   NaPS: −450 to −560 mV; at 9 to 15#/T dosage rate
   KPS: −450 to −560 mV; at 6 to 11#/T dosage rate
NOTE: #/T=pounds reagent per ton of Cu/Mo concentrate feed, dry basis.

A typical testing protocol that simulates plant operations was used for the testing with some variations depending on the specific plant location and desired parameter optimization. A typical Mo flotation process which is the basis of the simulated testing has Cu/Mo Concentrate flow passing sequentially through a Thickener (~60% Solids) to a stirred Conditioner, where polysulfide and other optional ingredients were added, then to a Rougher (where additional polysulfide might be added), a stirred conditioner, followed by a Cleaner and filtration. An example of the testing protocol is as follows:

a) Cut sample of thickener underflow (60% solids) and adjust to 30% solids after the Conditioner.
b) Transfer sample to a 1.2 L or larger to a Denver (or similar) flotation cell.
c) Add reagent to achieve desired ORP range. Amount added is in pounds per US don (dry weight), where 1 pound per ton is equivalent to 0.0005 Kg polysulfide per Kg concentrate (dry basis).
d) Condition for 1 to 30 min as necessary.
e) Float for 12 to 20 min as necessary with a slow to moderate froth removal rate for good selectivity, where air, nitrogen, or CO2 could be used for flotation.
f) (OPTIONAL STEP) during flotation; Stop flotation floatation, add additional reagent to bring ORP back to desired range.
g) (OPTIONAL STEP) during flotation; Add small amount of frother/collector if necessary.

ORP, pH and reagent additions were recorded during the testing. The typical temperature and pH ranged for the starting thickener underflow samples were between 60 deg. F. (15.6 degrees C.) and 80 deg. F. (26.6 degrees C.) and pH of 10.0-11.0. Again, these were conditions tested in the lab, but wide variations in temperature are to be found in the various separation plants and such temperatures will not cause issues.

Results from three representative tests and one comparative example, which are averages of multiple series of testing at each condition, are tabulated below. This data shows the effectiveness of these polysulfide reagents in the Mo separation process in comparison to the comparative test with the NaHS reagent. In a typical Cu/Mo concentrate, Mo content ranged between 0.8-3.5% with Cu content ranging between 25-35%. The ore bodies tested also range in mineralogy containing primarily Chalcopyrite with smaller amounts of Chalcocite, Covellite and Bornite with Cu/Mo contents of 0.3-0.5% and 0.02-0.04%, respectively.

| Depressant | Test # | Conc., Wt % | Cu % | Fe % | Mo % | Mo Rec % | Tail Mo % | K |
|---|---|---|---|---|---|---|---|---|
| CaPS | 1 | 8.8 | 18.9 | 17.9 | 15.9 | 95.8 | 0.07 | 11.3 |
| NaPS | 2 | 11.5 | 13.1 | 7.3 | 36.6 | 97.0 | 0.15 | 8.7 |
| KPS | 3 | 9.4 | 17.3 | 18.9 | 14.9 | 96.8 | 0.05 | 10.6 |
| NaHS | Comp. 4 | 9.5 | 16.6 | 18.6 | 15.2 | 97.6 | 0.04 | 10.5 |

In the above data, Conc. Wt % is weight percent floated compared to the feed weight, the Cu %, Fe %, and Mo % are assays of the concentrate. Mo Rec % is the molybdenum recovery in percent, and the Tail Mo % is the tailing (not separated) molybdenum assay. Generally, acceptable tailings content is 0.2% or less, but this is highly dependent on feed (concentrate) molybdenite content as well as other process factors. The final column K is the ratio of Mo concentration removed, as K=[% Mo in concentrate−% Mo in tail]/[% Mo in feed−% Mo in tail].

Comp example 4 is a comparative example.

It is seen that the K value is substantially the same using the polysulfide reagents as with the comparative NaHS reagent. This shows that the polysulfides tested provided recovery comparable to that provided by NaHS, but without the safety and health issues (H2S release, toxic agents, and the like) present when using NaHS. Hydrogen sulfide release is extremely important in the industry, as potentially fatal concentrations can readily accumulate. Greater recovery and K than is seen with NaSH seems possible with calcium polysulfide. Note Test 2 with NaPS was performed on a higher grade feed material than the other tests, so the numbers are somewhat different in comparison.

Some testing was conducted at higher temperatures using hot dilution water, which showed improved separation and recoveries due to the dispersion effect achieved with the higher temperature. These tests were not deemed relevant as this is not a typical or feasible operation at all plant sites and due to this effect being equivalent for all reagents. The depressing agents and methods of this invention are applicable over the range of temperatures found in the industry.

Plant Scale testing with CaPS as the depressant, was conducted successfully at a mine site with a copper molybdenum orebody. This testing showed that the polysulfides used in the invention are useful even at a wide range of Mo content of the feed, in this case less than 1% by weight, and at widely varying feed rates. The important operating and metallurgical parameters of the test are shown below:

Operating Parameters
Conditioning time –12 minutes
Flotation Time –29 minutes
Depressant Dosage –7#/T to 30#/T
pH=10 to 12
ORP Range –430 mV to –470 mV
Flotation Medium Nitrogen
Pulp Density –30% Solids
Metallurgical Information
　Feed Content –0.335% Mo
　Concentrate –48.0% Mo
　Tailing –0.092% Mo
　Molybdenum Recovery 74.4%

Tests of Polysulfide H2S Evolution vs. pH

The H2S evolution due to the decomposition of depressant reagents during storage, handling and application presents the highest associated hazard with regards to health and safety (HSE). Testing of TKI's Alkaline Polysulfide products against the standard (NaHS reagent) was conducted in a simulated flotation process using lab apparatus to determine the amount of H2S evolved at various pH's. The tests were conducted using the following testing protocol;

All tests were ran at ambient temperatures using tap water.
　Add 500 ml of tap water to 1000 L glass apparatus, check pH and temp, start and maintain stirring throughout test.
　Add Ca(OH)2 to raise pH to approximately 10.5
　Add 5 mL of reagent.
　Allow to stabilize for 2 min, with cracking of stopper to equilibrate at 1 min.
　Check pH, temperature and H2S in VP using analyzer.
　Add H2SO4 to decrease pH to ~9.
　Allow to stabilize for 2 min, with cracking of stopper to equilibrate at 1 min.
　Check pH, temperature and H2S in VP using analyzer.
　Repeat last three Steps for pH 9, 8 and 7 if applicable.

Test results are summarized in FIG. 1, which shows the ppm hydrogen sulfide (H2S) evolved versus the pH of the liquid. At pH greater than 10 to 10.5, the samples with calcium polysulfide (CaPS), potassium polysulfide (KPS), and sodium polysulfide (NaPS) showed low (less than 200 ppm) H2S in vapor phase, as did the concentration of H2S in the vapor phase above comparative examples using NaHS. However, when the pH was adjusted to between 9 and 9.5, the hydrogen sulfide in the vapor phase above the NaHS samples spiked to 1500 ppm, while the concentration of H2S in the vapor phase above the samples of CaPS, NaPS, and presumably KPS remained low. Note the H2S in the vapor phase above the polysulfide samples increased to 1500 ppm at pH near 8.2, while this 1500 ppm level was reached by NaHS samples at pH 9.1 to 9.3. The polysulfide products show significantly less H2S evolution than the standard NaHS as pH is reduced. This would translate into a less hazardous environment in applications where the process is run ran at lower pH's (~9) utilizing for example CO2 as a flotation medium or modifying agent.

Values above 1500 ppm are lower limits, as the H2S meter maximum reading was 2000 PPM. The maximum PPM readings for Polysulfides were significantly less than that for NaHS samples, however, based on the time required for the meter to return back to a zero baseline. Therefore, this invention may show significant health and safety benefits even at pH near 8.

The invention is meant to be illustrated to, but not limited by, the Examples. There were additional tests performed, but the Examples are representative of and consistent with the other tests.

The invention claimed is:

1. A method of concentrating molybdenite from a concentrate slurry comprising molybdenite and copper sulfide minerals or copper iron sulfide minerals, comprising the steps of:
　a) providing said concentrate slurry wherein the pH of said concentrate slurry is greater than 8.0 and less than 11;
　b) adding an effective amount of a depressing reagent to said concentrate slurry, wherein the depressing reagent is selected from one or more alkaline polysulfides, alkaline earth polysulfides, or a mixture thereof;
　c) passing a gas through said concentrate slurry containing the depressant reagent and having a pH of greater than 8 and less than 11 to selectively concentrate said molybdenite in a froth from copper sulfide minerals or copper iron sulfide minerals which are concentrated in a remaining tailings slurry; and
　d) recovering said molybdenite from the froth; wherein the one or more polysulfides is effective at selectively depressing the copper sulfide minerals or copper iron sulfide minerals.

2. The method of claim 1 wherein the pH of the concentrate slurry before adding the depressing reagent is at or above 8.5 and less than 10.

3. The method of claim 1, wherein the depressing reagent comprises calcium polysulfides, and wherein the calcium polysulfides have an average of between 4 and 4.5 sulfur atoms per molecule.

4. The method of claim 2, wherein the depressing reagent comprises calcium polysulfides, and wherein the calcium polysulfides have an average of between 4 and 4.5 sulfur atoms per molecule.

5. The method of claim 1, wherein the depressing reagent comprises an alkaline polysulfide selected from sodium polysulfide, potassium polysulfide, or a mixture or a combination thereof, and wherein the alkaline polysulfide has an average of between 2 and 4 sulfur atoms per molecule.

6. The method of claim 2, wherein the depressing reagent comprises an alkaline polysulfide selected from sodium polysulfide, potassium polysulfide, or a mixture or a combination thereof, and wherein the alkaline polysulfide has an average of between 2 and 4 sulfur atoms per molecule.

7. The method of claim 1, wherein the depressing reagent is substantially free of thiosulfates.

8. The method of claim 1, wherein the depressing reagent is added at a rate of about 0.003 to 0.0125 Kg of polysulfide(s) per Kg of concentrate slurry (dry basis).

9. The method of claim 3, wherein the calcium polysulfides are added at a rate of about 0.003 to 0.006 Kg of polysulfides per Kg of concentrate slurry (dry basis).

10. The method of claim 1, wherein the depressing reagent is sodium polysulfide and is added at a rate of about 0.005 to 0.008 Kg per Kg of concentrate slurry (dry basis).

11. The method of claim 1, wherein the depressing reagent is potassium polysulfide and is added at a rate of about 0.003 to 0.055 Kg per Kg of concentrate slurry (dry basis).

12. The method of claim 1, wherein the amount of the polysulfides is sufficient to maintain the Slurry Oxidation-Reduction Potential in the range of −450 mV and −480 mV.

13. The method of claim 1, wherein said molybdenite recovered in step (d) from the froth is 95 weight % or greater based on molybdenite in the concentrate slurry.

14. The method of claim 1, further comprising the step of manufacturing the polysulfide depressing reagent selected from alkaline earth polysulfides, alkaline polysulfides, or a mixture thereof.

15. A method of concentrating molybdenite from a concentrate slurry comprising molybdenite and copper sulfide minerals or copper iron sulfide minerals, comprising the steps of:
   a) providing said concentrate slurry
   b) adding a depressing reagent to said concentrate slurry, wherein the depressing reagent comprises at least about 0.0017 Kg of alkaline polysulfide(s), alkaline earth polysulfide(s), or a mixture thereof, per Kg of concentrate slurry (dry basis), wherein the pH of the resulting slurry is greater than 8 and less than 11;
   c) passing a gas through said concentrate slurry containing the depressant reagent and having a pH of greater than 8 and less than 11 to selectively concentrate said molybdenite in a froth from copper sulfide minerals or copper iron sulfide minerals which are concentrated in a remaining tailings slurry; and
   d) recovering said molybdenite from the froth; wherein the one or more polysulfides is effective at selectively depressing the copper sulfide minerals or copper iron sulfide minerals.

16. The method of claim 15, wherein the pH of said concentrate slurry before adding the depressing reagent is at or above 8.0 and is less than about 10.0, and wherein the depressing reagent comprises at least about 0.004 Kg of alkaline polysulfides, alkaline earth polysulfides, or a mixture thereof per Kg concentrate slurry (dry basis).

17. The method of claim 16, wherein the depressing reagent comprises at least about 0.0017 Kg calcium polysulfides per Kg concentrate slurry (dry basis).

18. The method of claim 15, wherein the depressing reagent comprises at least about 0.0017 Kg calcium polysulfides per Kg concentrate slurry (dry basis).

19. The method of claim 1, wherein the pH of the concentrate slurry is in the range between 8 and 11, and wherein the oxidation reduction potential of the concentrate slurry is in the range of −430 mV and −480 mV.

20. The method of claim 19, wherein the polysulfides are effective at selectively depressing copper sulfide minerals or copper iron sulfide minerals, and wherein the pH of the concentrate slurry is between 9 and 10.

21. The method of claim 1, wherein the pH of the concentrate slurry before adding the depressing agent is between 9 and 10.

* * * * *